United States Patent [19]
Mochizuki et al.

[11] Patent Number: 5,113,273
[45] Date of Patent: May 12, 1992

[54] LIQUID CRYSTAL DISPLAY DEVICE

[75] Inventors: Akihiro Mochizuki, Atsugi; Hideo Hama, Ichihara; Mitsuaki Hirose, Tatebayashi, all of Japan

[73] Assignee: Fujitsu Limited, Kawasaki, Japan

[21] Appl. No.: 496,030

[22] Filed: Mar. 20, 1990

[30] Foreign Application Priority Data

Mar. 20, 1989 [JP] Japan .................................. 1-67863

[51] Int. Cl.⁵ .............................................. G02F 1/13
[52] U.S. Cl. .......................................... 359/56; 359/75; 359/100; 359/104
[58] Field of Search ............ 350/350 S, 333, 336; 340/784, 805

[56] References Cited

U.S. PATENT DOCUMENTS

| | | | |
|---|---|---|---|
| 4,040,720 | 8/1977 | York | 350/333 |
| 4,681,404 | 7/1987 | Okada et al. | 350/350 S |
| 4,738,515 | 4/1988 | Okada et al. | 350/350 S |
| 4,836,655 | 6/1989 | Yamazaki | 350/350 S |
| 4,978,203 | 12/1990 | Yamazaki et al. | 350/339 R |

FOREIGN PATENT DOCUMENTS

0176623  10/1983  Japan .................................. 350/350 S

OTHER PUBLICATIONS

N. A. Clark et al. "Submicrosecond bistable electro-optic switching in liquid crystals", Appl. Phys. Lett. 36(11), 899, Jun. 1, 1980.

M. Ikeda et al. "Low Resistance Copper Address Line for TFT-LCD", Japan Display '89, pp. 498-501.

*Primary Examiner*—Rolf Hille
*Assistant Examiner*—Tan Ho
*Attorney, Agent, or Firm*—Staas & Halsey

[57] ABSTRACT

A liquid crystal display device comprising a layer of a ferroelectric liquid crystal material sandwiched between opposed first and second electrodes. The display device further comprises a dielectric layer as a capacitive element which is electrically connected through an electrically conductive connecting means to the first electrode so that the dielectric layer and the liquid crystal material are connected in parallel with regard to an external electric source. The display device provides a large area and high information content display, high contrast ratio display, and high gradation display, together with a stabilized memory effect.

18 Claims, 15 Drawing Sheets

REDUCTION OF TRANSMITTANCE WITH TIME

STABILIZED TRANSMITTANCE WITH TIME

DEPENDENCY OF LUMINANCE RATIO ON CAPACITANCE

LIQUID CRYSTAL DISPLAY DEVICE

BACKGROUND OF THE INVENTION

1. Field of the Invention

The present invention relates to a liquid crystal display device, more particularly, a liquid crystal display device containing a ferroelectric liquid crystal material sandwiched between first and second electrodes. The display device is driven in accordance with a simple matrix address system, and therefore, can provide a large area and high information content display, high contrast display and high gradation display. Further, since the display device contains a dielectric layer as a capacitative element disposed and electrically connected therein in parallel to the liquid crystal material with regard to an external electric source, a stabilized memory effect can be obtained as a result of an extension of a relaxation time of the spontaneous polarization of the liquid crystal material. Therefore, the display device can be widely and advantageously utilized as a display panel in word processors, personal computers, work stations and other devices.

2. Description of the Related Art

Liquid crystal display devices are widely used as a display panel in word processors or laptop computers, due to their flat panel configuration and are drivability at a low power consumption. Particularly, the display devices using a super twisted nematic (STN) liquid crystal are more widely used and are especially suitable as a display panel for large display size devices such as personal computers, since large size devices having a display area of 12 inches diagonal can be relatively easily produced using the STN liquid crystals.

Recently, a need has arisen for an increased display speed, in connection with an increased display area or information content amount of the display panels, as the display panels are now applied to high-performance word processors and personal computers. The above-described STN liquid crystals, however, cannot solve this problem. Practically, the STN liquid crystals are advantageous when displaying character information, as in word processors, but cannot be used to display a moving picture due to an unacceptably slow display speed.

More recently, it has been found that ferroelectric liquid crystal devices (FLCDs) or liquid crystal display devices using the ferroelectric liquid crystal material can exhibit a remarkably increased display speed, in addition to the many advantages of the STN devices described above. These FLCDs are described in, for example, N.A. Clark and S. T. Lagerwall, "Submicrosecond Bistable Electro-Optic Switching in Liquid Crystals", Apple. Phys. Lett. 36 (11), 899, Jun. 1, 1980. Note, a ferroelectricity of the FLCDs is based on a spontaneous polarization of the liquid crystal molecules, and the ferroelectricity occurs when the spontaneous polarization is reversed as a result of the reversal of the polarity of the applied electric field.

Generally, as is well-known in the art, the FLCDs comprise a layer of the ferroelectric liquid crystal sandwiched between the opposed first and second electrodes. To drive the FLCDs, pulsed voltage or electric field with a positive or negative polarity is applied to the FLC layer through the first and second electrodes from an external electric source. The spontaneous polarization of the liquid crystal molecules is thus adjusted to the same direction, and this state, i.e., information display state, is maintained by the ferroelectricity of the liquid crystal, i.e., the memory effect of the liquid crystal in which the direction of the spontaneous polarization is not changed. When the displayed information is to be changed, it is possible to newly apply a pulsed voltage having a reversed polarity to the FLC layer, thereby changing a direction of the spontaneous polarization therein. Apparently, the performances of the resulting FLCDs depends on how long a memory effect of the liquid crystal can be stably maintained.

An equivalent circuit of the prior art FLCDs is illustrated in, for example, FIG. 1. The FLC device 1 comprised a capacitor 2 with the capacitance $C_{LC}$ and a resistance 3 having a sum R of the internal resistances of the device 1 and an external electric source 4, and is connected to the electric source 4. As described hereinafter, the FLCDs suffer from a relaxation of the spontaneous polarization thereof, which relaxation corresponds to a discharge of the electric charge stored in the capacitor of the device. The relaxation time $\tau$ is calculated in accordance with the following equation:

$$\tau = k \cdot R \times C_{LC} \qquad (1)$$

in which k is a proportionality factor. In use, the prior art FLCDs having the equivalent circuit such as that of FIG. 1 show a reduction of transmittance with time. For example, when a pulsed voltage having a predetermined level is applied at 400 $\mu$s to the FLCD, as shown in FIG. 2, information is displayed made at a predetermined transmittance. The displayed information should be maintained without reduction of the transmittance, until the next pulsed voltage having a reversed polarity is applied to the device (0.5 s). As shown in the graph of the transmittance of FIG. 2, however, the transmittance is significantly reduced within 0.5 seconds, and this significant reduction of the transmittance means a reduction of the contrast and other performances of the device. Note, of course, a minor reduction of the transmittance cannot be detected by the naked eye.

The above-described reduction of the transmittance of the FLCDs with time is considered to be due to a change of the direction of the spontaneous polarization of the liquid crystal; ideally such a change does not occur in the FLCD3. This will be further described with reference to FIGS. 3A and 3B, which correspond to FIG. 1.

First, to drive the FLC device 1, a pulsed voltage is applied to the device 1 from an external electric source 4. As shown with arrows in FIG. 3A, the liquid crystal molecules of the device have the same direction of spontaneous polarization. The illustrated direction of the spontaneous polarization should be stably maintained during the display period of the information, to thereby ensure a stabilized memory effect of the FLC device. Nevertheless, the FLC device 1 is liable to gradually and partially change the direction of the spontaneous polarization.

An undesirable change of the spontaneous polarization is shown in FIG. 3B (see, three dotted lines of the device 1). More particularly, although not shown in FIG. 3B, the direction of the spontaneous polarization is gradually shifted to the left or right, and in some cases, is completely reversed. The reasons for this change are, for example, nonuniform orientation of the liquid crystal, inconsistency of the interaction between the interfacial substrate and the liquid crystal molecules, and an incomplete structure of the liquid crystal layer.

Since a closed circuit as shown in FIG. 3B is produced after the application of the pulsed voltage, the device will be metastable. The metastable state is created by the generation of the internal electric field in the device due to the spontaneous polarization of the liquid crystal itself. The generated internal electric field will act to negate as external electric field applied to the device. Thus, the internal electric field makes a depolarization of the electric field. Accordingly, as times passes, the direction of the spontaneous polarization of the liquid crystal is partially switched for the above-described reasons, e.g., nonuniformity of the orientation of the liquid crystal. When the direction of the spontaneous polarization is switched, the internal electric field is reduced or damped in the same sites of the device, and therefore, induce a reversal of the spontaneous polarization of the liquid crystal in other sites of the device, and thus the internal electric field is gradually reduced as a whole and eventually reaches zero. The absence of the internal electric field means that the memory capability of the device has been lost.

Under these circumstances, there is a need to provide an improved liquid display device having an excellent memory capability sufficient to ensure a stable drive of the device, and this is one object of the present invention. Note, in the prior art, it is impossible to completely remove the nonuniformity of the orientation and other factors in the production of a large size liquid crystal panel having a display area of, for example, 12 inches diagonal, although it is obvious that the above-described causes, including the nonuniformity of the liquid crystal panel, must be eliminated from the FLC device, to prevent the relaxation of the spontaneous polarization of the liquid crystal and thereby stably maintain the memory capability of the device.

Furthermore, although the object thereof is not a stable maintaining of the memory capability of the device, another type of the liquid crystal display device is well-known which is addressed by a nonlinear switching element such as thin-film transistor (TFT) and is briefly referred to as a TFT-LCD. The liquid crystal display mode of the TFT-LCDs is the twisted nematic (TN) mode, and a drive method thereof is an active matrix addressing. A principal object of these devices is to stably maintain the electric charge generated in the transistor stably, but TFT-LCDs can provide high quality images comparable to those of CRT (Cathode Ray Tube). The TFT-LCDs are described in, for example, M. Ikeda et al., Low Resistance Copper Address Line for TFT-LCD, Japan Display '89, pp. 498–501.

An equivalent circuit of the TFT-LCDs is illustrated in FIGS. 4 and 5. The device 5 comprised a capacitor 6 of the LC material with the capacitance $C_{LC}$ and a TFT 7 having the internal resistor $R_{LC}$, as well as a capacitor 8 with the capacitance $C_S$. The capacitor 8 is a memory storage capacitor. As apparent from these drawings, the TFT 7 is fabricated on each picture element (see also FIG. 6), and it and the LC material 6 are connected in parallel with regard to an external electric source (not shown). To ensure a stable retention of the voltage generated in the transistor, the capacitor or LC material 6 must have a capacitance $C_{LC}$ which conforms to the size of the picture element.

A typical constitution of the TFT-LCDs is illustrated in FIG. 7. A light source 11 is a fluorescent lamp from which the light is guided, in sequence, through a light guide 12 and a polarizer 13 to the TFT-LCD. As illustrated, a glass substrate 14 of the device has a TFT fabricated thereon. The TFT contains a gate electrode 15, source area 17, and drain area 18, as well as a display electrode 16 of indium-tin oxide (ITO). Another glass substrate 22 of the device has a black matrix 21, color filter 20, and counter electrode 19 of ITO coated in sequence thereon. Another polarizer 23 is disposed over the substrate 22. A twisted nematic (TN) liquid crystal 10 is sandwiched between the electrodes 16 and 19. Note, a gate insulating layer is not connected through an electrically conductive means by an opposed electrode 19 in the illustrated TFT-LCD, but as described hereinafter, a dielectric layer is connected through the electrically conductive means to the opposed electrode for the FLCD of the present invention.

SUMMARY OF THE INVENTION

According to the present invention, there is provided a liquid crystal display device which comprises a ferroelectric liquid crystal material or FLC sandwiched between a first electrode formed on a first substrate and an opposed second electrode formed through a dielectric layer on a second substrate, the dielectric layer being electrically connected through an electrically conductive connecting means with the first electrode so that the dielectric layer and the liquid crystal material are connected in parallel with regard to an external electric source for applying a pulsed voltage to the display device, and able to act as a capacitative element for extending a relaxation time of the spontaneous polarization of the liquid crystal material.

Preferably, the first and second electrodes are a set of crossed transparent electrodes in the form of stripes and the device is driven in accordance with a simple matrix address system.

According to the present invention since as described hereinafter, a capacitative element and FLC are disposed in parallel with regard to the electric source, it is possible to extend a relaxation time of the spontaneous polarization of FLC, and accordingly, improve a memory capability of the device. Practically, the FLCD of the present invention has enough memory capability to ensure a stable drive of the device, and therefore, shows a rapid display speed as well as a large display area and capacity. This FLCD can be produced at a low production cost.

DESCRIPTION OF THE PREFERRED EMBODIMENTS

Figure 1:
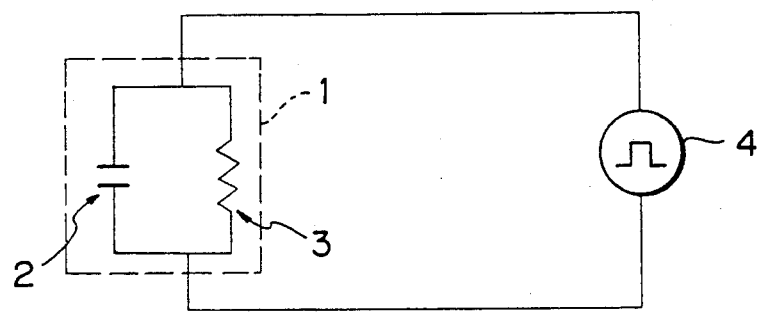
FIG. 1 shows an equivalent circuit of the prior art FLC device.

In the practice of the present invention, the FLC or ferroelectric liquid crystal material as a layer is sandwiched between the opposed first and second electrodes. Any FLCs conventionally used in the field of FLCDs may be used. Typical examples of the usable FLCs to which the present invention is not limited include:

| Compound | wt. % |
|---|---|
| Composition A | |
| 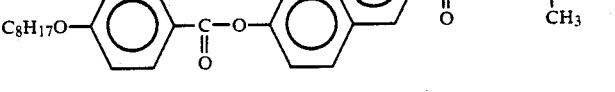 | 20.0 |
| 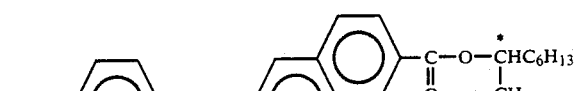 | 26.6 |
| 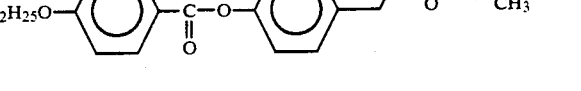 | 20.0 |
| 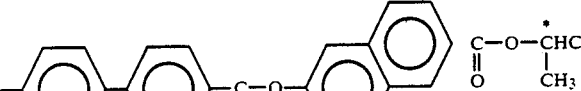 | 6.7 |
|  | 26.7 |
| Composition B | |
| 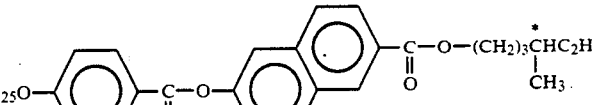 | 20.0 |
| 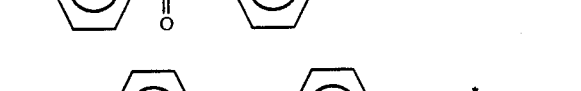 | 26.6 |
| 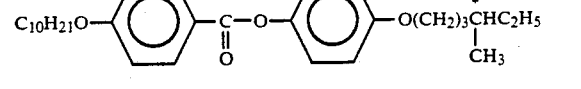 | 26.6 |

| Compound | wt. % |
|---|---|
| 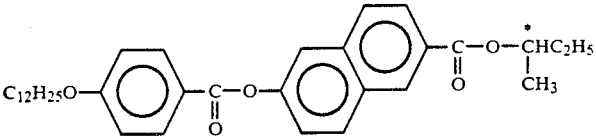 | 6.7 |
| 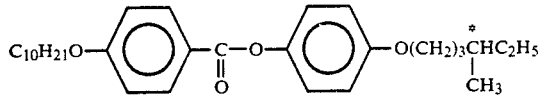 | 20.1 |
Composition C
| Compound | wt. % |
|---|---|
| 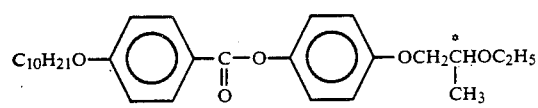 | 41.2 |
| 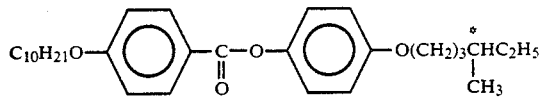 | 38.7 |
| 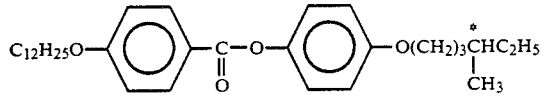 | 20.1 |
Composition D
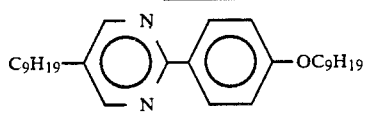
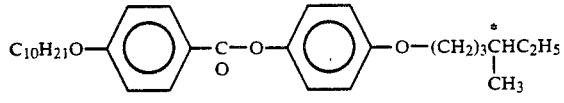
Composition E
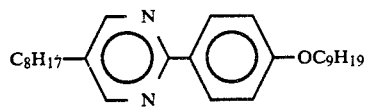
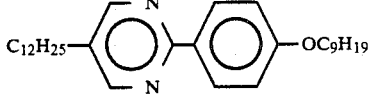
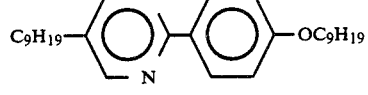
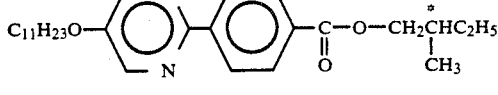

| Compound | wt. % |
|---|---|
| 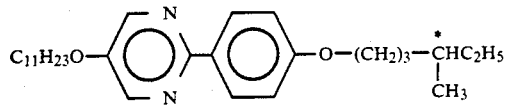 | | in which C* denotes a chiral carbon atom. The compositions A, B and C are described in Japanese Unexamined Patent Publication (Kokai) No. 1-101389, published Apr. 19, 1989.

The first and second electrodes used are transparent stripe electrodes and cross each other. These electrodes are generally supported on a transparent substrate such as a glass substrate, and are preferably deposited on the substrate by a well-known deposition method such as sputtering. A typical example of usable electrode materials includes indium oxide ($In_2O_3$) or indium-tin oxide (IT)). Note, according to the present invention, as previously and hereafter described, a dielectric layer is sandwiched between the second electrode and the second substrate.

The dielectric layer used between the electrode and substrate may be formed from any dielectric material, as long as the material can effectively act as the capacitive element. The dielectric layer is preferably a flat overcoat layer having an uniform thickness, and is preferably deposited on the second substrate by a well-known deposition method such as sputtering or CVD, as for the deposition of the electrodes. Typical examples of usable dielectric materials include magnesium oxide (MgO) or tantalum oxide ($Ta_2O_5$).

Generally, the dielectric layer or capacitative element is a capacitor having low polarity, but since the ferroelectric liquid crystal can respond to a polarity, the capacitative element is preferably a capacitor having a positive or negative polarity or a reversed polarity. Further, the capacitative element is preferably an electrolytic capacitor with or without polarity. Furthermore, preferably a capacitance of the capacitative element used is substantially equivalent to or slightly higher than that of the ferroelectric liquid crystal. An excessively reduced capacitance must be avoided as it causes a reduction of the transmittance of the liquid crystal.

To form a parallel connection of the dielectric layer and the liquid crystal with regard to the external electric source, an electrically conductive connecting means is incorporated into the display device. The connecting means is preferably an electrically conductive paste such as silver (Ag) paste (or carbon paste), as such a paste can be easily applied to the assembly to electrically connect the dielectric layer with the first electrode. Of course, other connecting means such as anisotropic conductive resins or other materials can be used, as long as they can form an electrical conduction between the dielectric layer and the electrode without adversely affecting the performances of the device.

The FLC devices of the present invention generally have a flat panel and preferably have an information content of 640×400 dots or more. Details of the FLC devices will be further described with reference to the accompanying drawings.

Figure 8:
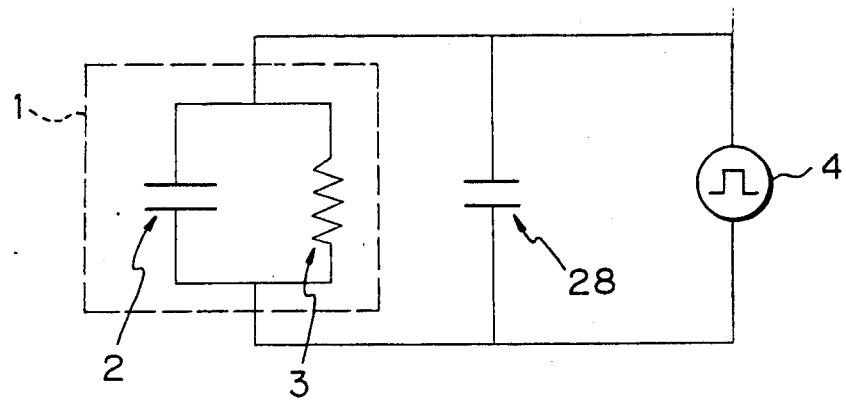
FIG. 8 shows an equivalent circuit of the FLC device of the present invention.

An equivalent circuit of the ferroelectric liquid crystal devices or FLCDs according to the present invention is illustrated in FIG. 8. The equivalent circuit of FIG. 8 is the same as that of FIG. 1 except that an additional capacitor 28 with the capacitance $C_e$, herein referred as the dielectric layer or capacitative element, is connected in parallel to the FLC device 1 with regard to an external electric source 4. The device 1 comprised a capacitor 2 with the capacitance $C_{LC}$ and a resistance 3 having a sum R of the internal resistances of the device 1 and the electric source 4. The presence of the additional capacitor 28 effectively extends a relaxation time of the spontaneous polarization of the liquid crystal, so that an internal electric field of the device is not quickly or slowly reduced, to thereby improve a memory capacity or performance of the device.

The relaxation of the spontaneous polarization in the FLC device 1 corresponds to the discharge of the electric charge stored in the capacitor of the device, and accordingly, the relaxation time $\tau$, is calculated in accordance with the following equation:

$$\tau = k \cdot R \times (C_{LC} + C_e) \qquad (2)$$

in which k is as defined above, and $C_e$ is a capacitance of the additional capacitor 28 connected in parallel to the device 1. From the comparison of this equation (2) with the above-described equation (1), it is appreciated that, according to the FLC device of the present invention, a longer extension of the relaxation time of $(k \times R \times C_e)$ can be accomplished compared to the prior art FLC device. The relaxation time $\tau$ can be freely controlled by changing the capacitance $C_e$ of the capacitor 28 incorporated into the FLC device, and a memory capability of the resulting FLC device and a stability thereof will be notably improved as a result of this control of the relaxation time.

Figure 2:
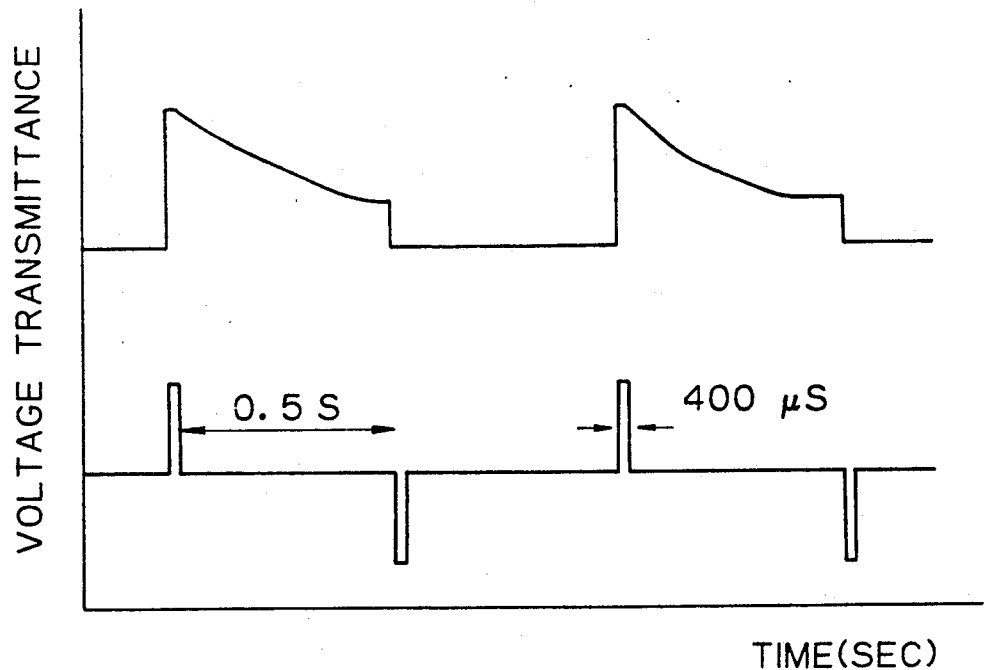
FIG. 2 is a graph showing the reduction of the transmittance in the prior art FLC device with time.
Figure 3A:
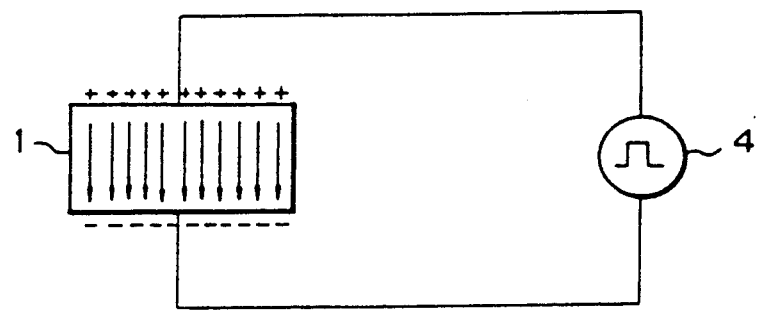
FIGS. 3A and 3B show a mechanism of the change of the spontaneous polarization in the prior art FLC device.
Figure 3B:
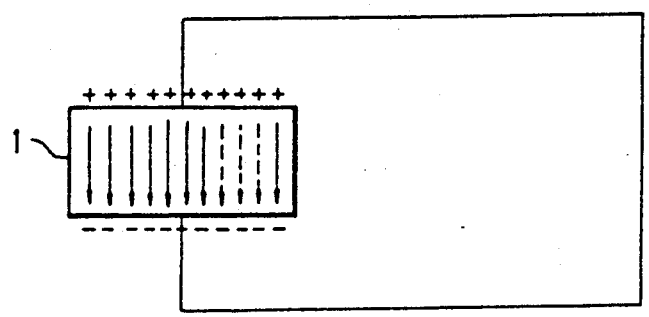
Figure 4:
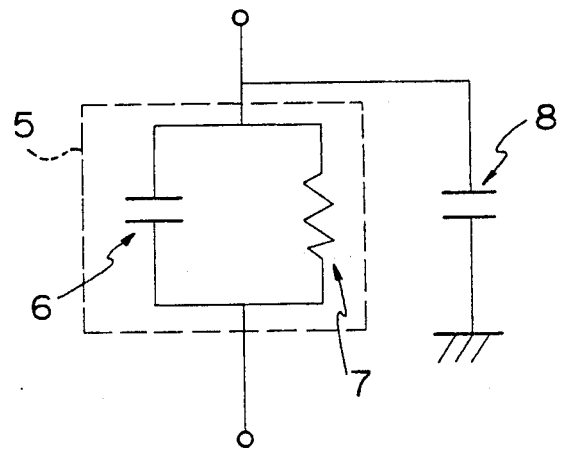
FIGS. 4 and 5 show an equivalent circuit of the prior art TFT-LC device.
Figure 5:
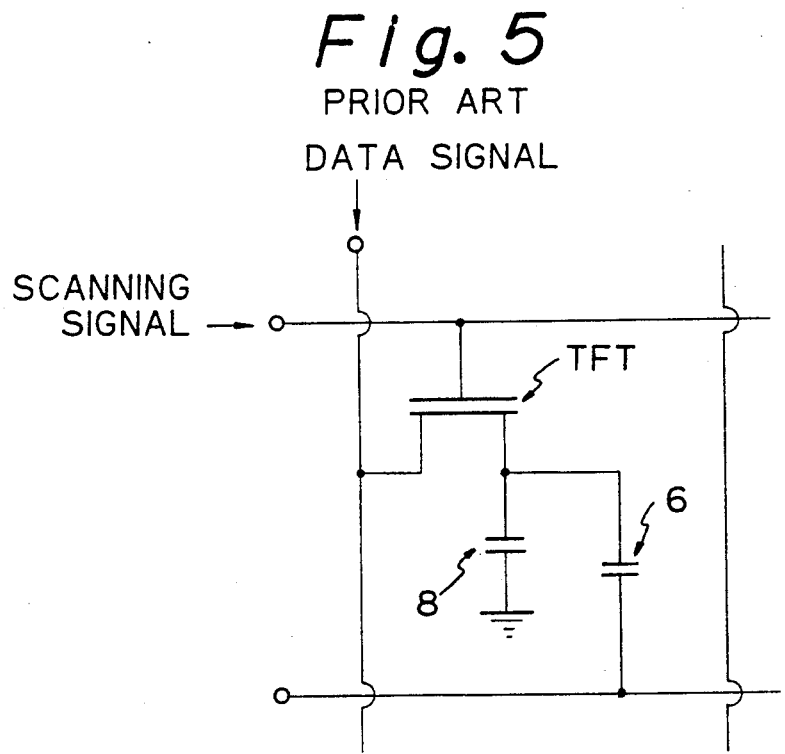
Figure 6:
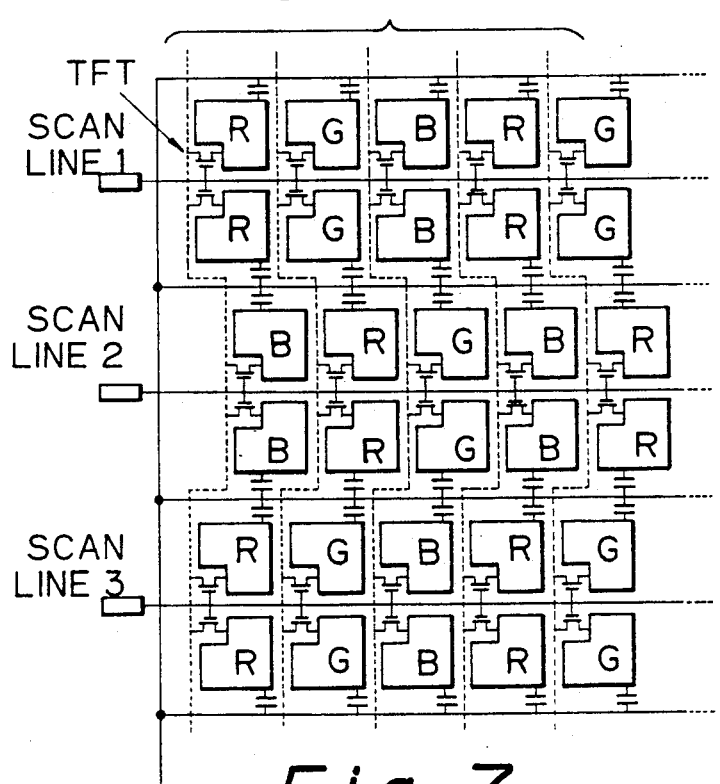
FIG. 6 shows a constitution of the active matrix address of the prior art TFT-LC device.
Figure 7:
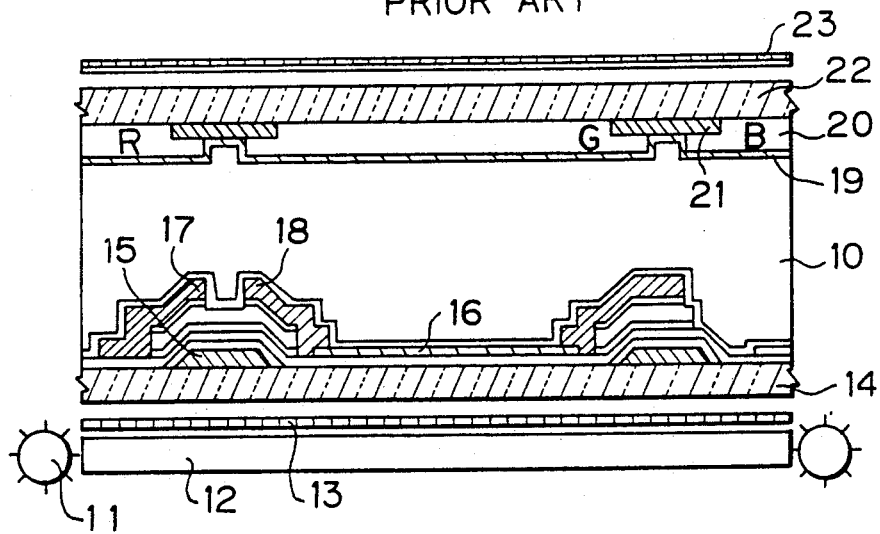
FIG. 7 is a cross-sectional view of the prior art TFT-LC device.
Figure 9:
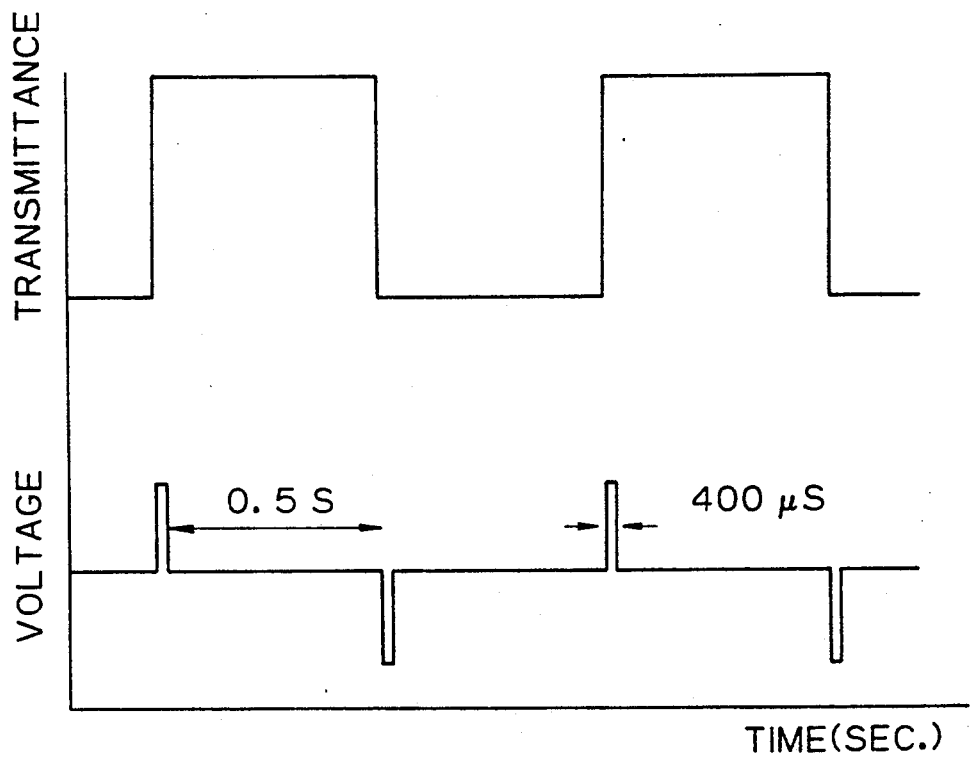
FIG. 9 is a graph showing the stabilized transmittance in the FLC device of the present invention.

The stabilized memory capability of the FLC device is illustrated in the graph of FIG. 9, which corresponds to FIG. 2 described above with reference to the prior art FLC device. In the application of the pulsed voltage at 400 $\mu$s, the information corresponding to the applied voltage is displayed in the FLC device, and the display is maintained by the next application of the pulsed voltage. As shown, the transmittance of the liquid crystal is maintained for 0.5 seconds without a reduction thereof. This maintenance of the transmittance is also referred herein to as a bistable state of the transmittance.

Figure 10A:
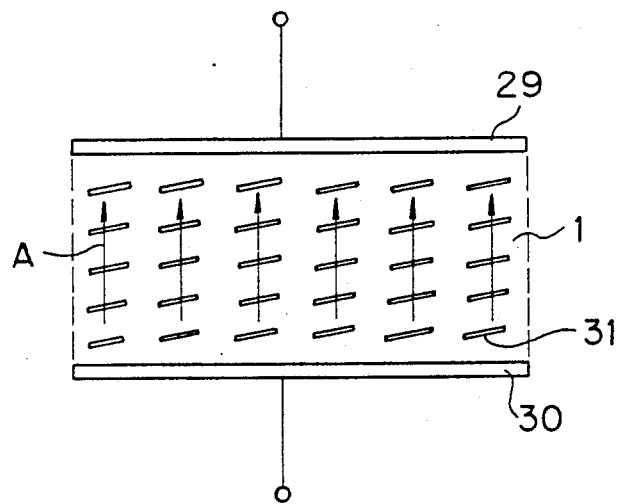
FIGS. 10A and 10B show a directional property of the spontaneous polarization of the liquid crystal in the present FLC device.
Figure 10B:
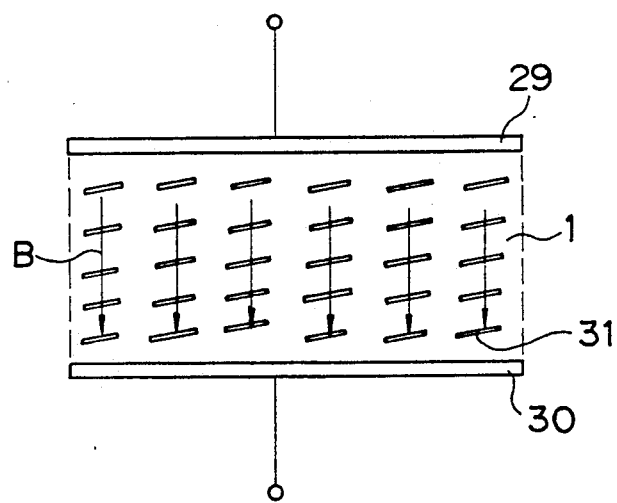

A directional property of the liquid crystal in the FLC device of the present invention is shown in FIGS. 10A and 10B. An FLC layer 1 containing the liquid crystal molecules 31 is sandwiched between an upper electrode 29 and a lower electrode 30 and, for example, a light or ON state is obtained when the liquid crystal molecules 31 have an upward orientation A of the spontaneous polarization (see, FIG. 10A). This light state is maintained until the display is made OFF. Upon the next application of the reversed pulsed voltage for erasing the display, a dark or OFF state is obtained. As shown in FIG. 10B, the liquid crystal molecules 31 have a downward orientation B of the spontaneous polarization.

As already described with reference to FIG. 8, generally the FLC device has an equivalent circuit of FIG. 11 in which a conventional capacitor 28 is used as a capacitative element. In this equivalent circuit, however, a problem of the assymmetry of the stability depending upon a polarity for the memory effect can arise, depending upon the direction of the spontaneous polarization of the liquid crystal (see, FIGS. 10A and 10B). It is considered that the assymmetric problem arises because of the slightly inclined molecules of the liquid crystal in the interface portion of the liquid crystal and the adjacent substrate, and because of the differences in the stability of the polarization direction due to an interaction between the polarity of the substrate surface and the spontaneous polarization of the liquid crystal itself.

Figure 11:
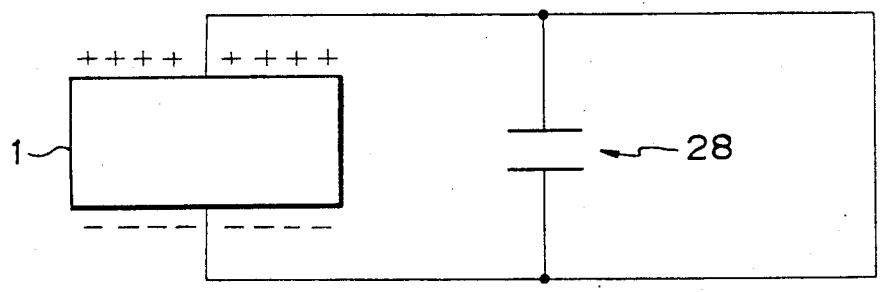
FIGS. 11 and 12 show a modification of the equivalent circuit of the present FLC device.
Figure 12:
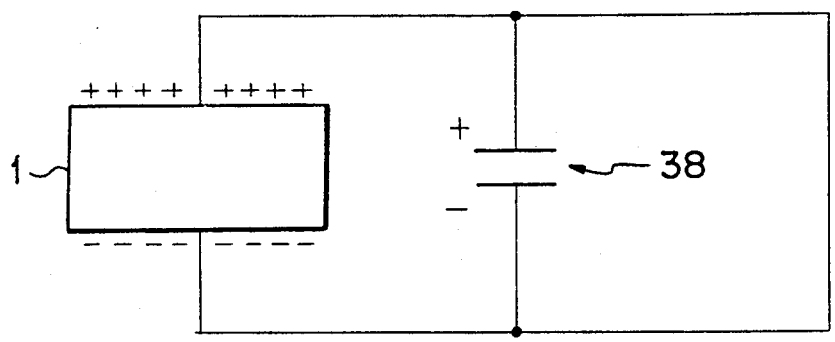

To solve the assymmetric problem, according to the present invention, a capacitor having a polarity such as an electrolytic capacitor 38 should be used as the capacitative element, instead of the capacitor 28 of FIG. 11 (see, FIG. 12). Since the electrolytic capacitor 38 has a polarity, the same memory effect can be obtained in both cases in which one has an upward spontaneous polarization and another has a downward spontaneous polarization. Note, FIG. 12 shows that a flow of the electric current in the illustrated equivalent circuit is prevented by the electrolytic capacitor 38.

The effects of the FLC devices according to the present invention will be further appreciated from the results plotted in FIGS. 13A to 13K and FIG. 14. To obtain these results, the following experiments were made.

Experiment A

A circular electrode of ITO having an electrode area of 176.7 mm$^2$ was sputtered on a glass substrate having a size of 25×25 mm$^2$. The circular electrode was spin-coated with polyvinyl alcohol (PVA) at a thickness of about 1000Å, and the PVA surface was rubbed by a conventional rubbing method. Two sheets of the processed glass substrates were laminated at a gap size of 2.0 μm, so that the circular electrodes were opposed to each other. An FLC test material consisting of an ester type liquid crystal composition was injected into a gap between the two substrates, and sealed to produce the FLC device.

The thus obtained FLC device was connected, in parallel, with a capacitor having different capacitances $C_e$, to determine a memory effect of the FLC device. The capacitances $C_e$ of the capacitors used herein were 0, 2 pF, 10 pF, 100 pF, 1,000 pF, 0.01 μF and 0.1 μF. A bipolar pulse with a width of 3.5 msec and a peak height of 15 volts was applied to the FLC device at intervals of 0.5 seconds, and a reduction of the transmittance during the pulse-free time of 0.5 seconds was determined for each device. The results of the determination are plotted in FIGS. 13A to 13G.

Figure 13A:
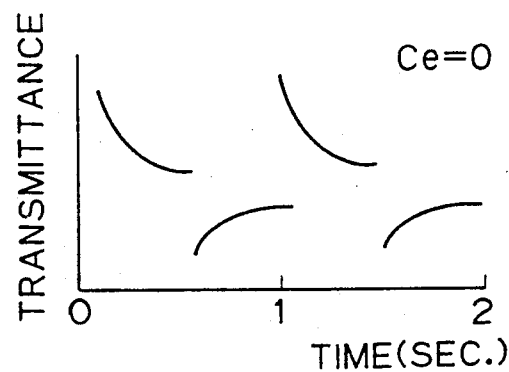
FIGS. 13A to 13K show a transmittance performance for different FLC devices.
Figure 13B:
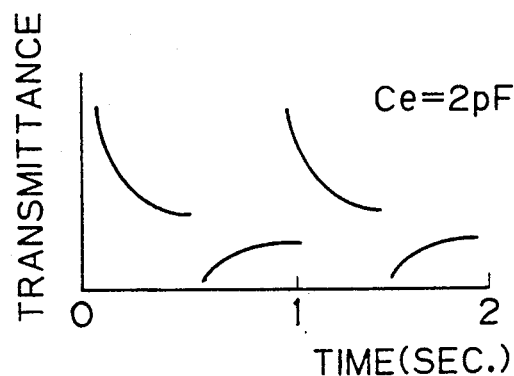
Figure 13C:
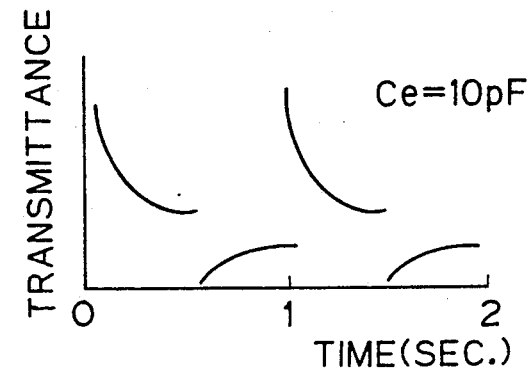
Figure 13D:
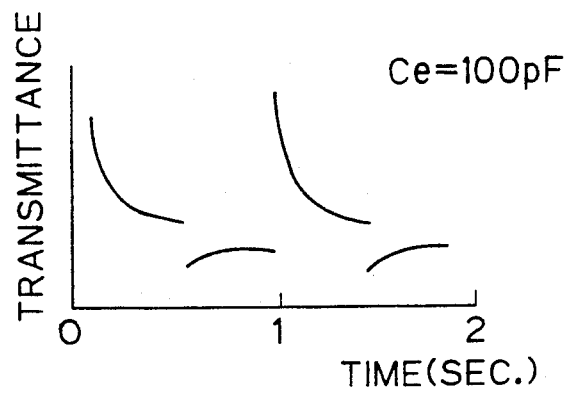
Figure 13E:
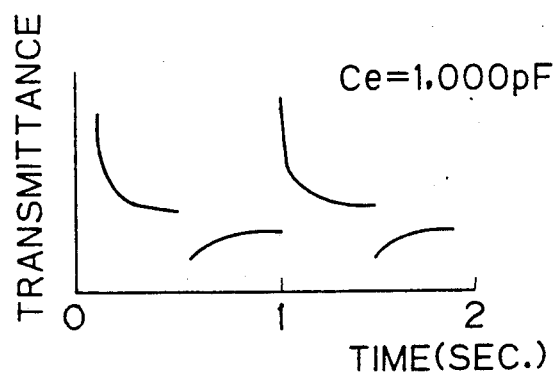
Figure 13F:
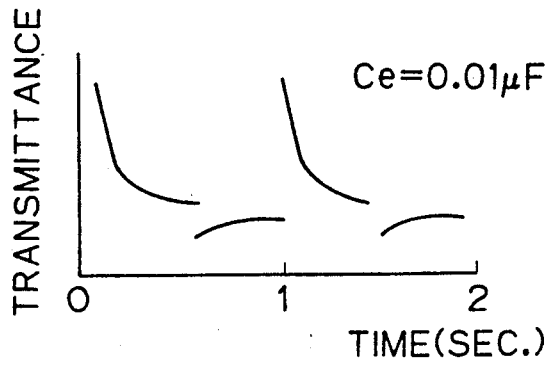
Figure 13G:
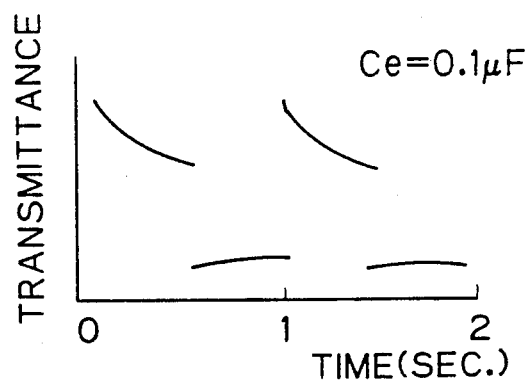

FIG. 13A shows the results for the "control" FLC device having no parallel capacitor ($C_e=0$). The results of this figure clearly show that the transmittance was largely reduced within only 0.5 seconds. The results of FIGS. 13B to 13F ($C_e=2$ pF to 0.01 μF) show that a substantial inhibition of the reduction of the transmittance was not obtained, although the capacitance $C_e$ was gradually increased. Surprisingly, however, the reduction of the transmittance was notably inhibited for the FLC device having the parallel capacitor ($C_e=0.1$ μF) (see, FIG. 13G).

Experiment B

The procedure of Experiment A was repeated except that the FLC device was connected, in parallel, with a Ta electrolytic capacitor having different capacitances $C_e$ (1 μF or 6.8 μF). The results of this determination are plotted in FIGS. 13H and 13I.

Figure 13H:
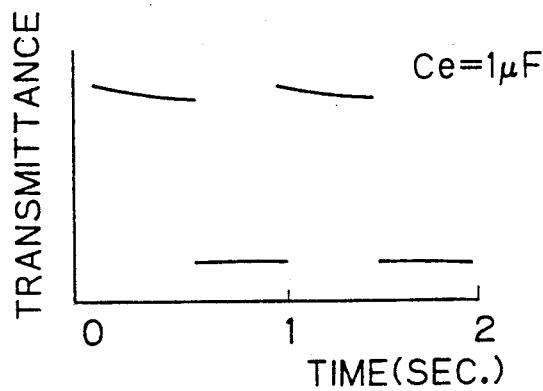
Figure 13I:
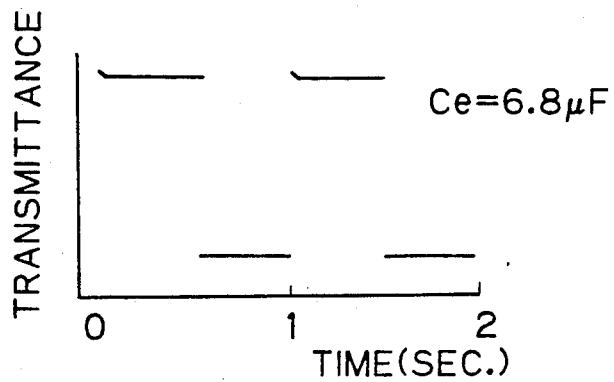

The results of FIGS. 13H and 13I clearly show that the reduction of the transmittance was substantially prevented at the capacitance $C_e$ of 1 μF, and was completely prevented at the capacitance $C_e$ of 6.8 μF.

Experiment C

The procedure of Experiment B was repeated, except that the Ta electrolytic capacitor having different capacitances $C_e$ (1 μF or 6.8 μF) was connected with the reversed polarity to the FLC device. The results of this determination are plotted in FIGS. 13J and 13K.

Figure 13J:
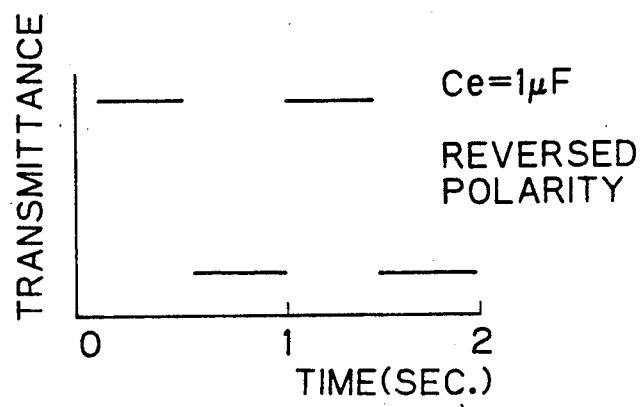
Figure 13K:
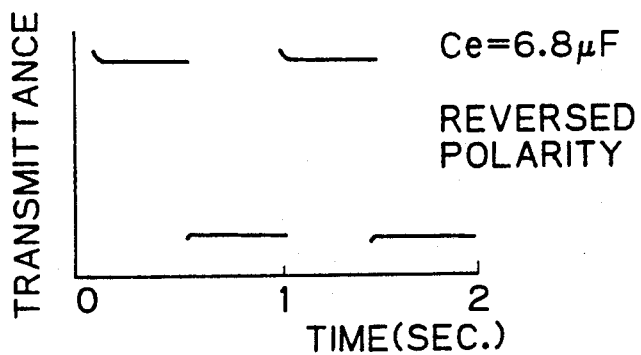

The results of FIGS. 13J and 13K show that the memory effect of the FLC device was changed as a result of reversal of the polarity of the electrolytic capacitor used. Namely, the memory capability of the device was stabilized if the electrolytic capacitor having the same polarity as that of the direction of the spontaneous polarization of the liquid crystal was connected to the device. On the other words, it can be seen from the graphs of FIGS. 13J and 13K that the direction of the spontaneous polarization of the ferroelectric liquid crystal and the polarity of the capacitor 38 are the same with regard to the direction of the electrical connection (see also FIG. 12).

Figure 14:
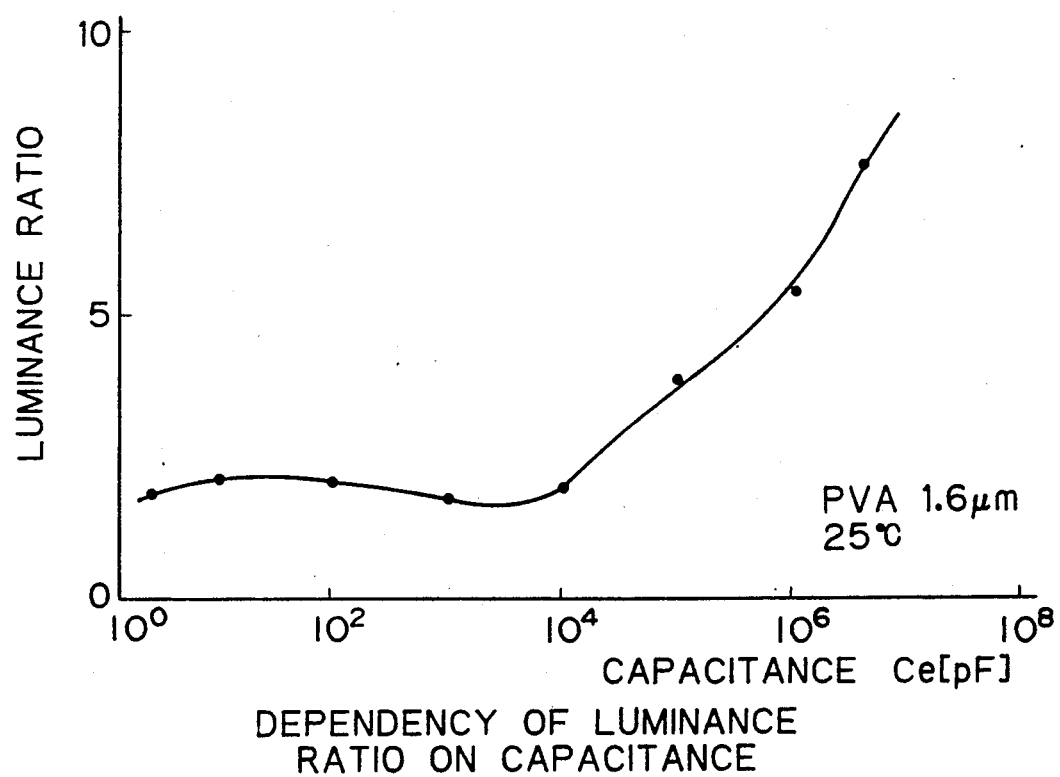
FIG. 14 is a graph showing the depending of the luminance ratio on the capacitance in the FLC device.

The procedures of the above Experiments A, B and C were again repeated, to determine a dependency of the luminance ratio on the capacitance $C_e$ at 25° C. The results plotted in FIG. 14 show that the luminance ratio was rapidly increased after the capacitance $C_e$ was increased to about $10^4$ pF. A preferred range of the capacitance Ce is within about $10^4$ to $10^5$ pF.

From the results of FIGS. 13A to 13K and FIG. 14, and since the FLC device used had a capacitance $C_{LC}$ of about 10 nF, it was found that an increased effect of inhibiting a reduction of the transmittance can be obtained when the capacitance $C_e$ of the parallel capacitor is equivalent to or more than the capacitance $C_{LC}$ of the liquid crystal, or the stabilized memory effect can be obtained when an additional capacitor which is electrically parallel to the liquid crystal and has a capacitance equivalent to or higher than the capacitance of the liquid crystal is incorporated into the FLC device.

Figure 15:
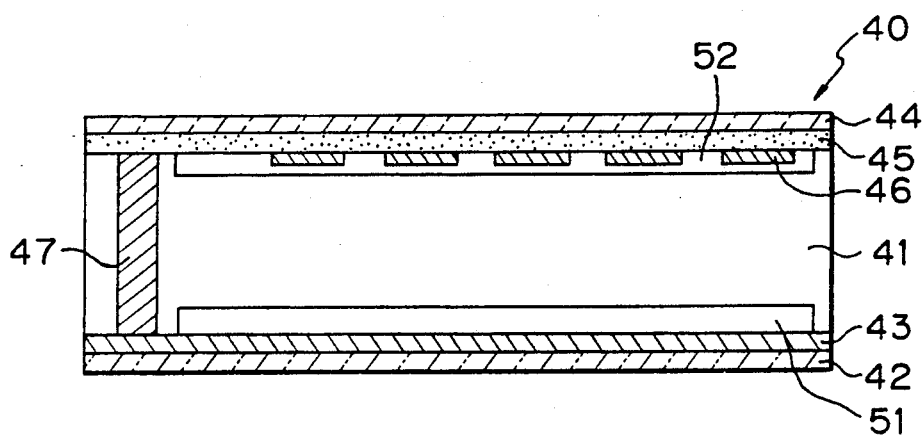
FIG. 15 is a cross-sectional view of the FLC device according to a preferred embodiment of the present invention.

The FLC devices of the present invention may have different panel structures, and a typical example of a usable FLC device is illustrated in FIG. 15 (cross-sectional view). The illustrated FLC device 40 contains a first glass substrate 42 having a first transparent electrode 43 such as transparent conductive coating, for example, $In_2O_3$, and an orientation layer 51 such as PVA rubbing layer applied thereon in sequence. The FLC device 40 also contains a second glass substrate 44 having a dielectric layer 45 as a capacitor such as MgO coating (or, for example, $Ta_2O_5$ sputtering coating), a second transparent electrode 46 such as $In_2O_3$, and an orientation layer 52 such as PVA rubbing layer applied thereon in sequence. The transparent electrodes used herein as the first and second electrodes are X-Y crossed stripes, and a ferroelectric liquid crystal 41 such as the above-described FLC composition A is sandwiched between these transparent electrodes, to form a FLC panel 40. Further, the FLC panel 40 contains a conductive means 47 such as Ag paste (or, for example, carbon paste or anisotropic conductive resin materials capable of exhibiting an electrical conductivity in a certain direction and an electrical insulating property in a direction perpendicular to said direction) for electrically connecting the dielectric layer 45 with the first transparent electrode 43.

Figure 16:
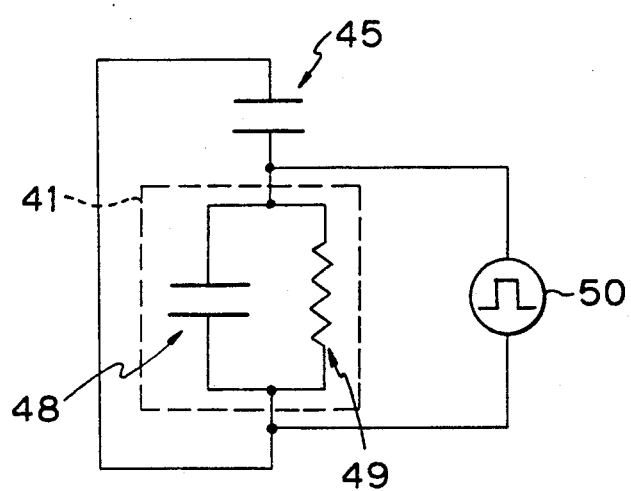
FIG. 16 shows an equivalent circuit of the FLC device of FIG. 15.

An equivalent circuit of the FLC device of FIG. 15 is shown in FIG. 16. It will be appreciated from this equivalent circuit that the dielectric layer 45 (capacitance $C_e$) is electrically connected in parallel to the capacitor 48 $C_{LC}$) and resistor 49 ($R_{LC}$) of the liquid crystal 41 with regard to an external electric source 50.

According to the present invention, the panel structure can be simplified and the additional parallel capacitor (Ce) electrically connected in paralle to the capacitor ($C_{LC}$), as a flat thin layer can be easily incorporated in the panel structure. Further, the panel structure can be produced by conventional production procedures and at a reduced production cost, together with the stabilized memory capability of the device.

To ascertain the effects of the FLC device of FIG. 15, the following experiment was made.

First, the FLC device was produced as follows. A glass plate having a size of 60×60×1.1 mm was polished to produce a glass substrate, and a transparent electrode of $In_2O_3$ was then sputtered on the glass substrate. The transparent electrode formed had a line pattern of 100 stripes having a pitch of 0.35 mm, width of 335 $\mu$m, interval or distance of 15 $\mu$m, and a resistivity value of 10 $\Omega/cm^2$. The same electrode formation was repeated except that, prior to the deposition of the transparent electrode, a dielectric layer of MgO with different layer thickness was sputtered on the glass substrate. The thickness of the MgO layer is shown in the following Table I. Each transparent electrode was spin-coated with a 3% by weight of aqueous PVA solution at a speed of 2,000 rpm for 30 seconds, and then cured at 150° C. for 1 hour to form a PVA orientation layer having a thickness of about 1000 Å. The PVA layers were rubbed so that, when the opposed glass substrates having each electrode were laminated to form a panel structure, they were parallel to each other in the rubbing direction. After the rubbing treatment, the processed glass substrates were laminated using a spacer of silica ($SiO_2$) ball having an average diameter of 1.6 $\mu$m, to make a gap having a size of 2-2.2 $\mu$m. At the same time, a silver paste was inserted between the MgO layer 45 and the opposed transparent electrode 43 to form an electrical contact means therebetween. The FLC composition A described above was injected into a cavity of the resulting cell utilizing the difference in pressure, and the cell finally sealed. Accordingly, the FLC devices of FIG. 15 having the X-Y crossed transparent electrodes were produced.

As described above, the FLC devices had the MgO layer with different layer thicknesses, and these devices were tested to determine a memory effect thereof. A bipolar pulse with a width of 500 $\mu$sec and peak height of 15 volts was applied at a intervals of 0.5 seconds to the FLC device, and a reduction of the transmittance during the pulse-free time of 0.5 second was determined for each device. The results of the determination are summarized in the following Table 1.

TABLE 1

| Thickness of MgO layer ($\mu$m) | Capacitance of MgO layer ($\mu$F) | Stability of Memory (%) |
|---|---|---|
| 0 (control) | — | 5 |
| 0.1 | 2.0 | 100 |
| 0.2 | 1.1 | 100 |
| 0.3 | 0.64 | 84 |
| 0.4 | 0.49 | 64 |
| 0.5 | 0.37 | 15 |

Figure 17:
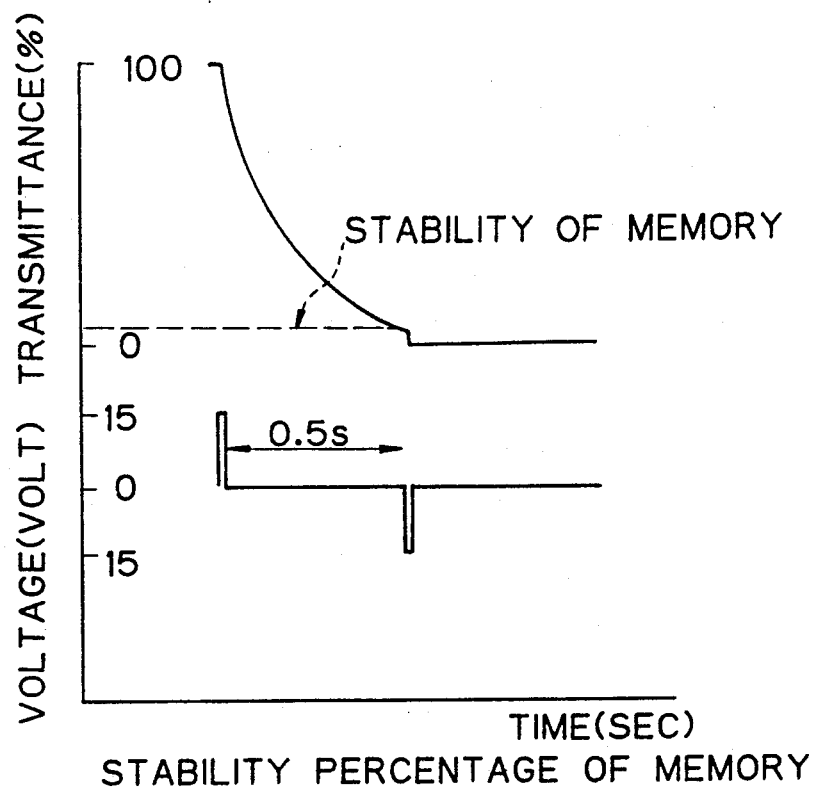
FIG. 17 is a graph showing the standard for determining a stability percentage of a memory.

The stability percentage of memory as shown in the third column of the Table 1 was determined as shown in FIG. 17. The transmittance ranged from 0% (completely dark state) to 100% (completely light state), and a level of the transmittance for each device was evaluated at 0.5 second after the removal of the applied electric field, to obtain the stability percentage.

As apparent from the results of Table 1, a memory stability of 80% or more was obtained for the MgO layer having a layer thickness of 0.1 to 0.3 $\mu$m, and a memory stability of 64% was obtained for the MgO layer of 0.4 $\mu$m. These memory stabilities are significantly higher than that of the control (5%; no MgO layer). Note, a memory stability of 100% was obtained for the two MgO layers (0.1 $\mu$m thickness and 2.0 $\mu$F $C_e$; 0.2 $\mu$m thickness and 1.1 $\mu$F $C_e$).

Figure 18:
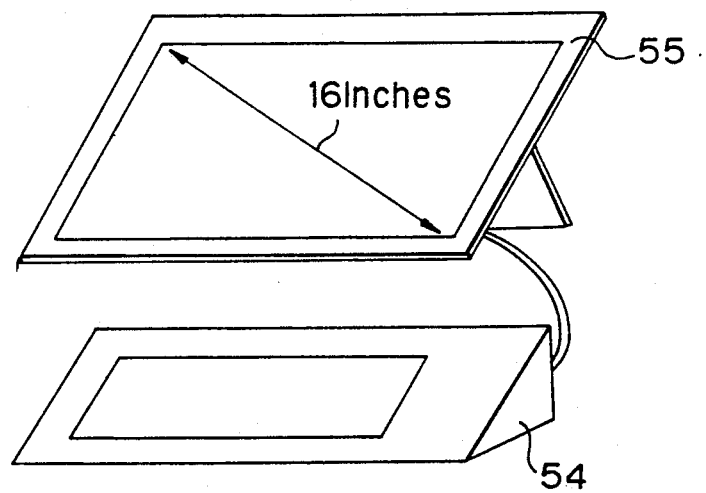
FIG. 18 is a perspective view showing an example of the FLC device according to the present invention.

The FLC devices according to the present invention can be widely used in the display and other fields. For example, they can be advantageously used as a direct view-type high information content and large area display panel as illustrated in FIG. 18. A keyboard 54 of FIG. 18 is connected with a display panel 55 or FLC device of the present invention. The illustrated panel 55 has a display size of 16 inches, and is particularly suitable as a display device for personal computers and work stations, for example.

Although the present invention has been described with regard to particular preferred embodiments thereof, the present invention is not restricted to these embodiments, and any modifications and improvements may be carried out within the scope and spirit of the present invention.

We claim:

1. A liquid crystal display device which comprises a ferroelectric liquid crystal material sandwiched between a first electrode formed on a first substrate and an opposed second electrode formed through a dielectric layer on a second substrate, the dielectric layer being electrically connected through an electrically conductive connecting means with the first electrode so that the dielectric layer and the liquid crystal material are connected in parallel with regard to an external electric source for applying a pulsed voltage to the display device, and so that the dielectric layer is able to act as a capacitative element for extending a relaxation time of the spontaneous polarization of the liquid crystal material, the capacitative element having a capacitance which is one ofsubstantailly equivalent to and slightly higher than that of the liquid crystal material.

2. A liquid crystal display device according to claim 1, in which the first and second electrodes are a set of crossed transparent stripe electrodes and the device is driven as a simple matrix address system.

3. A liquid crystal display device according to claim 1, in which the capacitative element is a flat overcoat layer having a uniform thickness.

4. A liquid crystal display device according to claim 1, in which the capacitative element is a capacitor having a low polarity.

5. A liquid crystal display device according to claim 1, in which the capacitative element is a capacitor having polarity or reversed polarity.

6. A liquid crystal display device according to claim 5, in which the capacitor is an electrolytic capacitor.

7. A liquid crystal display device according to claim 1, in which the electrically conductive connecting means is an electrically conductive paste.

8. A liquid crystal display device according to claim 1, in which the liquid crystal material has composition as follows:

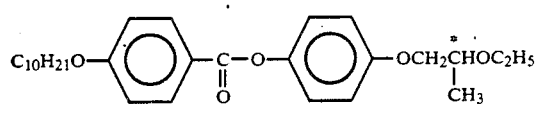

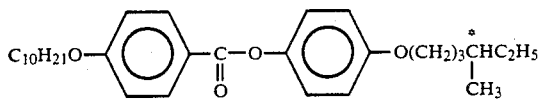

and

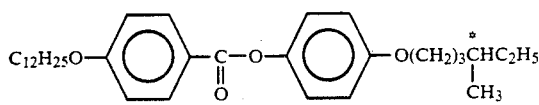

in which C* denotes a chiral carbon atom.

9. A liquid crystal display device according to claim 1, which has an information content of 640×400 dots or more.

10. A liquid crystal display device according to claim 1, which comprises a glass substrate as the first substrate having applied thereon, in sequence, a stripe indium-tin oxide coating as the first electrode, layer of the ferroelectric liquid crystal material, a stripe indium-tin oxide coating as the second electrode perpendicular to the first electrode, the dielectric layer supporting the second electrode, a glass substrate as the second substrate, and a silver paste as the connecting means sandwiched between the first electrode and the dielectric layer as well as the external electric source connected with the device.

11. A liquid crystal display device according to claim 2, in which the capacitative element is a flat overcoat layer having a uniform thickness.

12. A liquid crystal display device according to claim 2, in which the capacitative element is a capacitor having a low polarity.

13. A liquid crystal display device according to claim 2, in which the capacitative element is a capacitor having a polarity or reversed polarity.

14. A liquid crystal display device according to claim 13, in which the capacitor is an electrolytic capacitor.

15. A liquid crystal display device according to claim 2, in which the electrically conductive connecting means is an electrically conductive paste.

16. A liquid crystal display device according to claim 2, in which the liquid crystal material has a composition as follows:

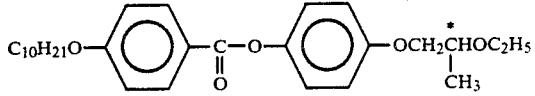

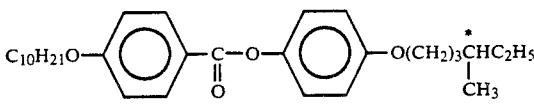

and

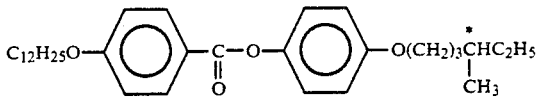

in which C* denotes a chiral carbon atom.

17. A liquid crystal display device according to claim 2, which has an information content of 640×400 dots or more.

18. A liquid crystal display device according to claim 2, which comprises a glass substrate as the first substrate having applied thereon, in sequence, a stripe indium-tin oxide coating as the first electrode, layer of the ferroelectric liquid crystal material, a stripe indium-tin oxide coating as the second electrode perpendicular to the first electrode, the dielectric layer supporting the second electrode, a glass substrate as the second substrate, and a silver paste as the connecting means sandwiched between the first electrode and the dielectric layer as well as the external electric source connected with the device.

* * * * *